United States Patent
Condino

(10) Patent No.: US 6,334,277 B1
(45) Date of Patent: Jan. 1, 2002

(54) RECREATIONAL VEHICLE DOOR

(75) Inventor: Jeffrey M Condino, Plano, TX (US)

(73) Assignee: Amerimax Building Products, Inc.

( * ) Notice: Subject to any disclaimer, the term of this patent is extended or adjusted under 35 U.S.C. 154(b) by 0 days.

(21) Appl. No.: 09/460,619

(22) Filed: Dec. 14, 1999

(51) Int. Cl.[7] ............................... E05D 15/00; E05D 7/10
(52) U.S. Cl. ................................. 49/381; 16/256
(58) Field of Search ............................. 49/381, 383, 394, 49/398–402, 505, 501; 16/1, 255, 256, 229, 257

(56) References Cited

U.S. PATENT DOCUMENTS

| | | | |
|---|---|---|---|
| 3,332,170 A | * 7/1967 | Bangs | 49/400 |
| 3,908,227 A | * 9/1975 | Cain | 16/137 |
| 3,924,293 A | * 12/1975 | Cain | 16/169 |
| 4,809,469 A | * 3/1989 | Klein | 49/394 |
| 4,906,033 A | 3/1990 | Sargent et al. | 292/3 S |
| 5,104,161 A | * 4/1992 | Kautt | 292/157 |
| 5,137,327 A | * 8/1992 | Edmonds et al. | 49/394 X |
| 5,172,519 A | * 12/1992 | Cooper | 49/400 |
| 5,222,287 A | 6/1993 | Cooper | 29/401.1 |
| 5,231,948 A | * 8/1993 | Malmanger et al. | 49/394 X |
| 5,388,424 A | * 2/1995 | Chopko et al. | 49/381 X |
| 5,528,865 A | * 6/1996 | Johnson et al. | 49/501 |
| 5,704,167 A | * 1/1998 | Swinderman | 49/381 |
| D390,525 S | 2/1998 | Antos et al. | D12/196 |
| 5,746,466 A | 5/1998 | Antos et al. | 296/37.1 |
| 5,940,934 A | * 8/1999 | Turner | 16/257 |
| 5,966,874 A | * 10/1999 | Repp et al. | 49/398 |

* cited by examiner

Primary Examiner—Alvin Chin-Shue
Assistant Examiner—Hugh B. Thompson
(74) Attorney, Agent, or Firm—Theodore F. Shiells

(57) ABSTRACT

A door assembly for a recreational vehicle has a molded mounting frame and a molded flange. The mounting frame and the door have integral hinge pin lugs. Spring-loaded hinge pins are captured within the hinge pin lugs and allow the door to swing open or close. A latch secures the door assembly in a closed position. The door may be thermally insulated. The hinge pins may be stainless steel. The latch may be a locking mechanism. The door securely conceals the door frame fasteners when the door assembly is in the closed position. One hinge pin may be fixed to one hinge pin lug.

22 Claims, 3 Drawing Sheets

RECREATIONAL VEHICLE DOOR

FIELD OF THE INVENTION

The present invention relates to doors. More particularly, the invention relates to compartment doors for recreational vehicles.

BACKGROUND OF THE INVENTION

Every year, thousands of vacationers load necessary equipment and supplies into recreational vehicles (R.V.'s) and venture across the countryside. Many R.V.'s incorporate all of the luxuries of a permanent residence. These roving homesteads often have full bathrooms, ample sleeping quarters, and kitchens with sinks, stoves and microwave ovens. Integrating these numerous features into a road-worthy vehicle is a difficult task.

The overall size of an R.V. is constrained by Department of Transportation limitations and operator maneuverability considerations. Designers must allocate space between permanent fixtures and storage areas because of this size limitation. Storage space is limited because other fixtures consume interior space. R.V. manufacturers alleviate this problem of limited interior storage space by installing exterior doors that allow access to otherwise inaccessible areas.

Exterior storage doors for recreational vehicles have many inadequacies. Currently available doors have many pieces that require labor intensive manufacturing and assembly processes. These doors consequently are expensive for the consumer. Many small parts also increase chances for mechanical failure.

Expense and fragility are not the only problems associated with currently available R.V. doors. Some exterior doors have exposed hardware, bulky profiles or seams that cause additional problems. Exposed and/or protruding components of an exterior door can be easily vandalized or damaged and do not provide necessary security for compartment contents. They can also increase the vehicle's overall coefficient of drag, which reduces fuel economy. Seams can leak.

R.V. manufacturers accordingly need a reliable exterior door system with few components to supply the consumer with a quality door at an affordable price.

SUMMARY OF THE INVENTION

The present invention is an improved door assembly for a recreational vehicle that comprises a mounting frame that has integral hinge pin lugs. The mounting frame is preferably integrally molded plastic. The hinge pin lugs on the mounting frame correspond to integral hinge pin lugs on a door. Spring-loaded hinge pins are captured within the hinge pin lugs. A latch secures the door assembly in a closed position. The latch may include a locking mechanism. The door is thermally insulated in one embodiment of the invention. The door securely conceals the mounting frame fasteners/hardware when the door assembly is closed in another embodiment. One hinge pin may be fixed to a hinge pin lug in another embodiment of the invention.

DETAILED DESCRIPTION OF THE INVENTION

Figure 1:
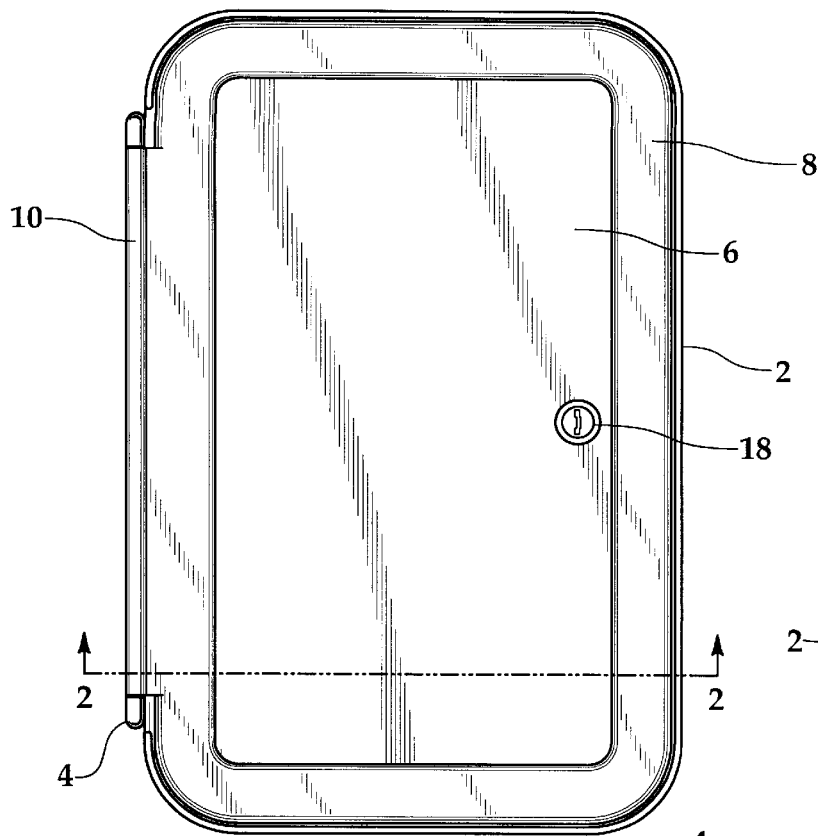
FIG. 1 is a plan view of the door assembly.
Figure 5:
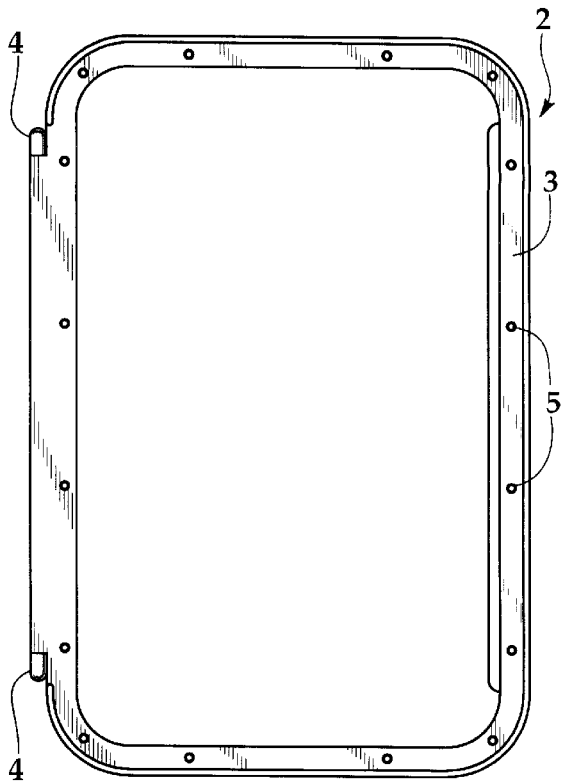
FIG. 5 is a plan view of the door frame.

Referring initially to FIG. 1, the R.V. door according to the present invention has a door frame 2 with two frame lugs 4 (also shown in FIG. 5). The door frame 2 may be injection molded with high-impact plastic and preferably has molded, one-piece flange 3 around the perimeter. The molded construction is preferred because it eliminates a butt seam in the frame 2 and flange 3 that could be sources of leaks. The frame 2 may also be made from aluminum, fiberglass, carbon fiber or some other suitable material used by persons with ordinary skill in the art, with or without a butt-seam. The frame 2 may be attached to a recreational vehicle (not shown) through the flange 3 with screws, bolts, rivets, adhesive or any other method of fastening. A plurality of fastening holes 5 are formed around the flange 3 (also shown in FIG. 5). The flange 3 is substantially flush with the surface of the recreational vehicle.

Figure 4:
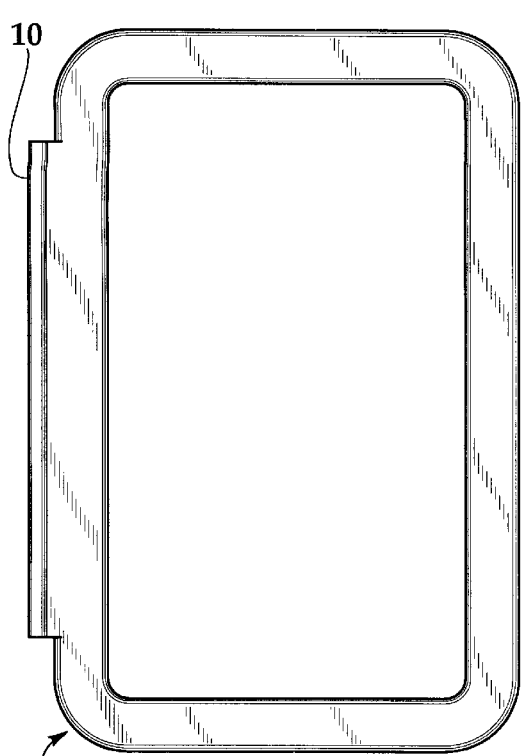
FIG. 4 is a plan view of the core frame.
Figure 6:
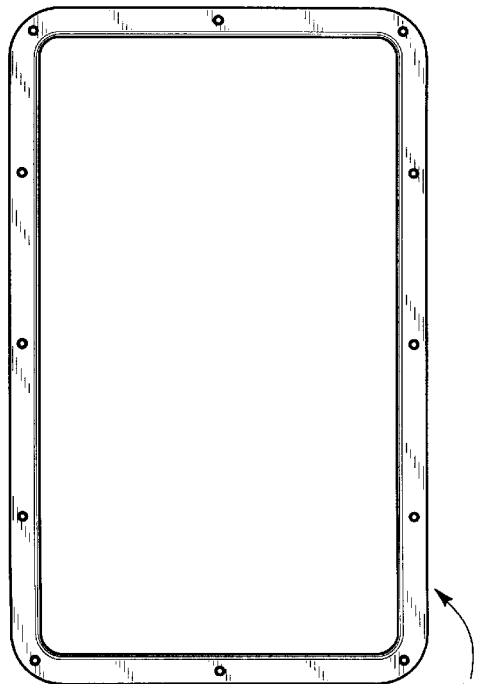
FIG. 6 is a plan view of the core retainer.
Figure 7:
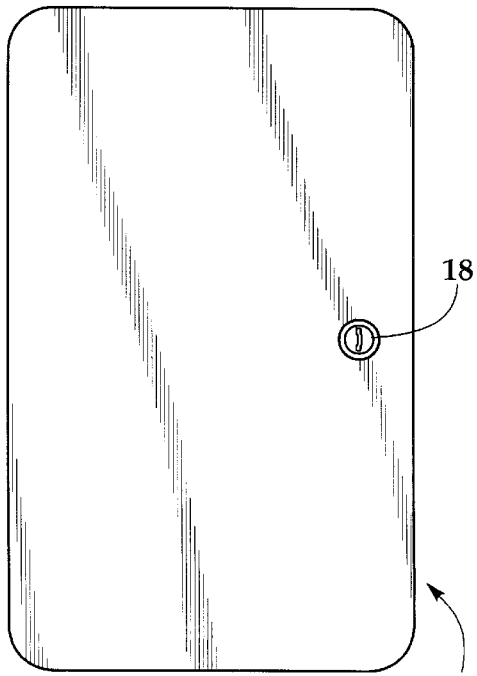
FIG. 7 is a plan view of the door core.

A core frame 8 (also shown in FIG. 4) with two core frame lugs 10 fits within the door frame 2. A door core 6 (also shown in FIG. 7) is sandwiched between the core frame 8 and a core retainer 12. The core frame 8 and the core retainer 12 (also shown in FIG. 6) are typically injection molded with the same high-impact plastic as the door frame 2. The core frame 8 and the core retainer 12 may also be made from aluminum, fiberglass, carbon fiber or some other suitable material to those with ordinary skill in the art. Screws (not shown) that pass from the core retainer 12 into the core frame 8 secure the door core 6 between the core frame 8 and the core retainer 12. The door core 6 may also be secured between the core frame 8 and the core retainer 12 with bolts, rivets, adhesive, or some other method of fastening.

The door assembly may be secured in the closed position with a latch 18. The latch 18 is substantially flush with the exterior of the door assembly to decrease tampering, enhance aesthetic appeal, and maintain vehicle aerodynamics. The latch 18 provides security for the compartment contents by protecting the contents from theft or loss. The latch 18 also provides an external means for opening the door. The latch 18 is a locking mechanism in a preferred embodiment of the invention. Several different locking mechanisms that also open the door may be utilized. A simple keyed lock that engages a locking lever is used in a preferred embodiment. Flush-mounted, paddle-handle or push-button locking mechanisms may also be used. Other suitable latching methods will be obvious to those with ordinary skill in the art.

Figure 2:
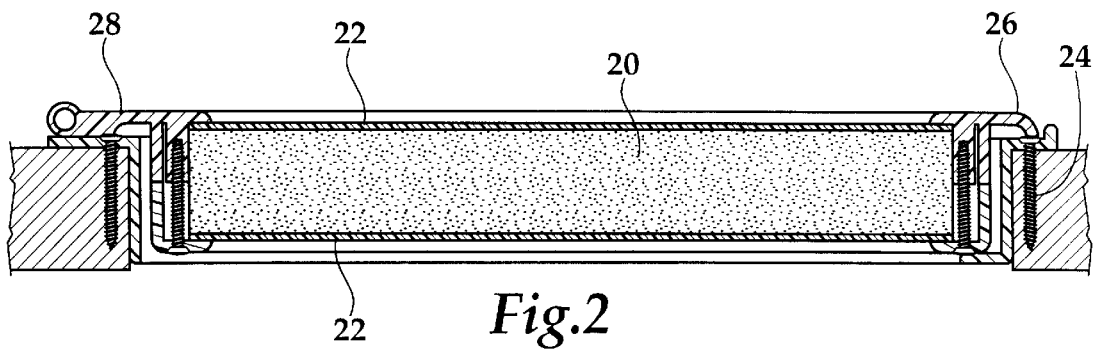
FIG. 2 is a cross section of the door assembly along line 2—2.

Referring now to FIG. 2, the flange 3 is preferably secured to the wall of the R.V. by means of screws 24 inserted through holes 5 (shown in FIG. 5). Core frame 8 is constructed with a frame screw cover lip 28 that, when closed, is disposed over the screws 24, thus concealing them and preventing their loosening. On the side of core frame 8, having core frame lug 10, the lug 10 includes a screw lug cover face 28 that when the frame 2 is in the closed position, also prevents their loosening.

Figure 8:
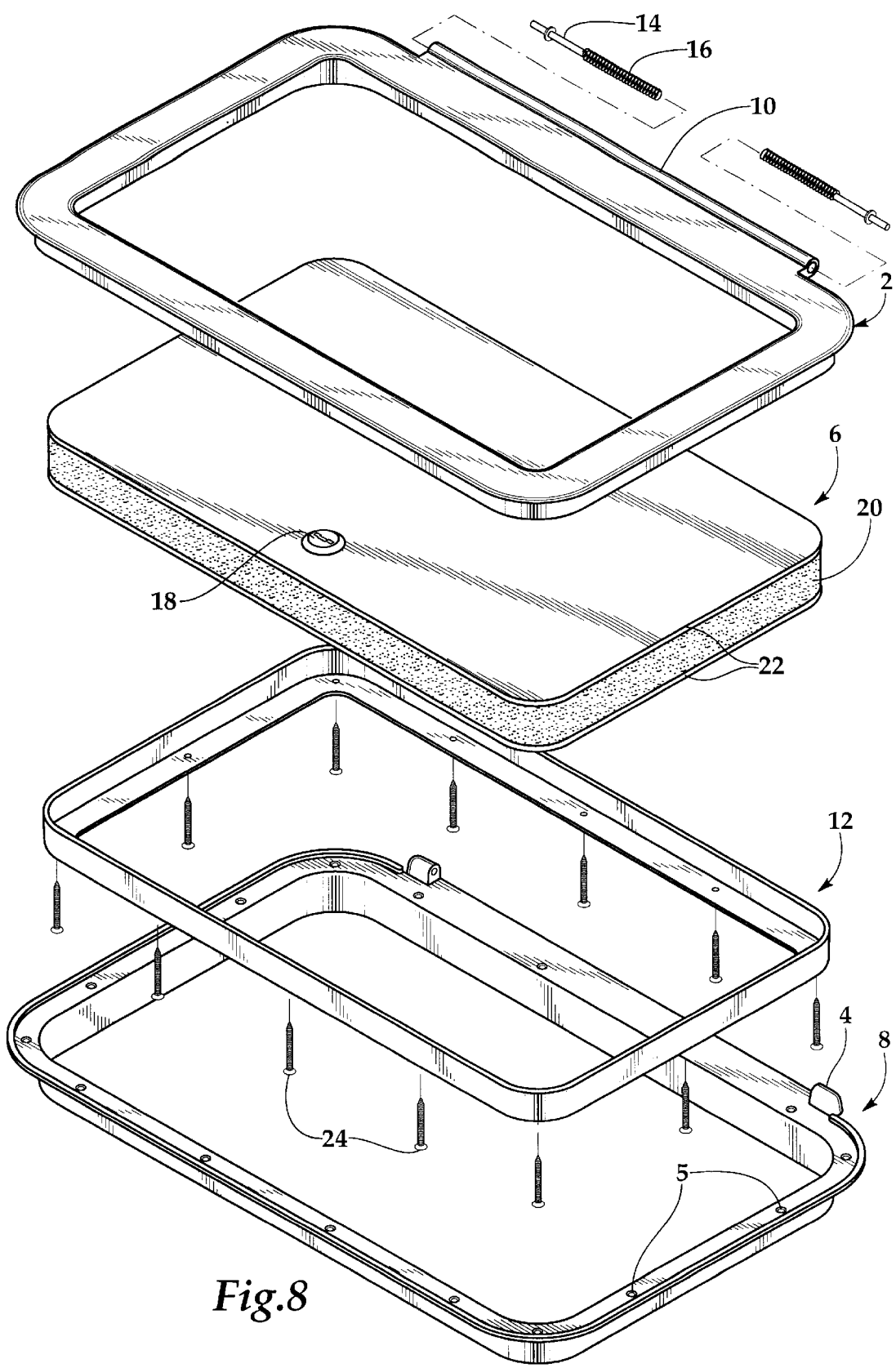
FIG. 8 is an exploded perspective view of the door assembly.

The door core 6 (also shown in FIG. 8) may be made from a layer of core insulation 20 sandwiched between two core panels 22. The door core 6 protects the contents of the compartment from either hot or cold environmental conditions and from external impact. The core insulation 20 may be a variety of insulating materials, for example, Reactive Hotmelt Polyurethane Adhesive. The core insulation 20 adds rigidity and R-value to the door assembly. Core panels 22 may be sheets of aluminum, fiberglass, or any other suitable material. A combination of core panel materials may be used to fit a particular application. A door core 6, for example, may have a fiberglass core panel 22 on the exterior face and an aluminum core panel 22 on the interior face.

Figure 3:
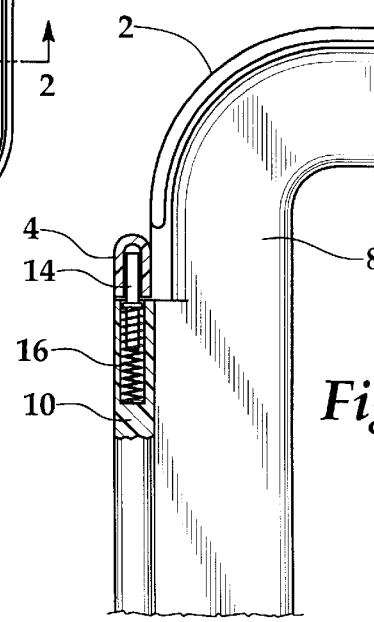
FIG. 3 is a cut away detail of the hinge assembly.

As best illustrated in FIG. 3, the core frame lugs 10 align with the frame lugs 4. Cavities in the core frame lugs 10 accept a pin 14 and a spring 16, which is compressed for assembly. The pin 14 is ideally made from a non-reactive material, for example, stainless steel. The spring 16 forces the pin 14 from the cavity (as shown) in the core frame lug 10 into the cavity in the frame lug 4. The pin 14 may also be forced from the cavity in the frame lug 4 into the cavity in the core frame lug 10. The spring 16 holds the pin 14 in compression between the cavities in the lugs 4, 10. The lugs 4, 10 are free to rotate about the axis of the pin 14 to allow the door assembly to be opened or closed. The lugs 4, 10 and the pin 14 have a relatively frictionless interface that eliminates the need for lubrication and are virtually maintenance-free. The lugs 4, 10 also conceal the pin 14 when assembled, which enhances security and increases aesthetic appearance.

It should be appreciated from the above description that many different configurations of the hinge joint and pin 14 are contemplated. A door assembly may incorporate a single pin 14 that passes through a channel in a core frame lug 10 and engages two frame lugs 4, which are positioned on either end of the core frame lug 10. Such a configuration would be similar to a wristwatch pin that fastens a watch bracelet to a watch.

In another embodiment, two or more hinge joints may be utilized to hinge the frame 2 to the core frame 8. A door assembly having two hinge joints may have one hinge joint with a fixed pin 14 in the cavity of the frame lug 4. A door of this configuration is assembled by inserting the protruding end of the fixed pin 14 into the cavity of one core frame lug 10. A pin 14 and spring 16 is inserted into the cavity of the other frame lug 4. The other core frame lug 10 may be concentrically aligned with the corresponding frame lug 4 by depressing the pin 14, which compresses the spring 16, and aligning the frame lug 4 with the core frame lug 10. Releasing the pin 14 allows spring 16 to partially decompress and urge a portion of the pin into the cavity in the core frame lug 10.

The fixed pin 14, alternatively, may be fixed in a cavity of the core frame lug 10. Assembly is essentially the same as described above except that the protruding end of the fixed pin 14 is inserted into the cavity of one frame lug 4. The pin 14 and spring 16 are positioned in the opposite lugs and the door assembly is complete.

What is claimed is:

1. A door assembly for a recreational vehicle comprising:

a mounting frame having integral hinge pin lugs having at least one open pin-receiving end;

a door having integral hinge pin lugs having at least one open pin-receiving end;

at least one axially spring-loaded hinge pin having a first end retained in one of said open pin-receiving ends and a second end in the other of said open pin-receiving ends and axially springeably biased into said other open pin-receiving end so that said pin is captured between the mounting frame hinge pin lugs and the door hinge pin lugs; and a latch to secure the door assembly in a closed position.

2. The door assembly of claim 1 wherein the door is thermally insulated.

3. The door assembly of claim 1 wherein the hinge pins are stainless steel.

4. The door assembly of claim 1 wherein the latch is a locking mechanism.

5. The door assembly of claim 1 wherein the door frame is fastened to a recreational vehicle with fasteners; and the door securely conceals the fasteners when the door assembly is in the closed position.

6. The door assembly of claim 1 wherein one of said hinge pins is fixed to one mounting frame hinge pin lug.

7. The door assembly of claim 1 wherein one of said hinge pins is fixed to one door hinge pin lug.

8. A door assembly for a recreational vehicle comprising:

a mounting frame having hinge pin lugs having at least one open pin-receiving end;

a door core secured within a door flame, the door frame having hinge pin lugs having at least one open pin-receiving end;

at least one axially spring loaded hinge pin having a first end retained in one of said open pin-receiving ends and a second end in the other of said open pin-receiving ends and axially springeably biased into said other open pin-receiving end so that said pin is captured between the mounting frame hinge pin lugs and the door frame hinge pin lugs; and a latch to secure the door assembly in a closed position.

9. The door assembly of claim 8 wherein the door core is thermally insulated.

10. The door assembly of claim 8 wherein the hinge pins are stainless steel.

11. The door assembly of claim 8 wherein the latch is a locking mechanism.

12. The door assembly of claim 8 wherein the door frame further comprises a core frame and a core retainer.

13. The door assembly of claim 8 wherein the mounting frame has a mounting flange;

the mounting flange is flush with a surface of the recreational vehicle;

the mounting flange is secured to the surface of the recreational vehicle with fasteners; and the door frame securely conceals the fasteners when the door assembly is in the closed position.

14. The door assembly of claim 8 wherein one of said hinge pins is fixed to one mounting frame hinge pin lug.

15. The door assembly of claim 8 wherein one of said hinge pins is fixed to one door hinge pin lug.

16. A concealed door hinge assembly comprising:

a door having a first integral lug, the integral lug having a first cavity;

a frame having a second integral lug, the integral lug having a second cavity;

a pin axially positioned with one end retained in the first cavity and another end retained in the second cavity; and a partially axially compressed spring abutting the pin within the first cavity and axially springeably biasing its other end into the second cavity.

17. The concealed door hinge assembly of claim 16 wherein the pin is stainless steel.

18. The concealed door hinge assembly of claim 16 wherein the door and the frame are molded high-impact plastic.

19. A concealed door hinge assembly comprising:
- a door having a first integral lug and a second integral lug, the first integral lug having a first cavity and the second integral lug having a second cavity;
- a frame having a third integral lug and a fourth integral lug, the third integral lug having a third cavity and the fourth integral lug having a fourth cavity;
- a first pin axially positioned between the first cavity and the third cavity, and a second pin axially positioned between the second cavity and the fourth cavity; and
- a first partially axially compressed spring abutting the first pin within the first cavity and axially springeably biasing an end of said pin into the third cavity and a second partially axially compressed spring abutting the second pin within the second cavity and axially springeably biasing an end of said pin into the fourth cavity.

20. The concealed door hinge assembly of claim 19 wherein the first pin is fixed in the first cavity.

21. The concealed door hinge assembly of claim 19 wherein the first pin is fixed in the third cavity.

22. The concealed door hinge assembly of claim 19 wherein said door hinge assembly is mounted on a door.

* * * * *